(12) United States Patent
Suehiro et al.

(10) Patent No.: US 8,021,756 B2
(45) Date of Patent: Sep. 20, 2011

(54) MICROLENS ARRAY

(75) Inventors: Ichiro Suehiro, Ibaraki (JP); Hiroyuki Katayama, Ibaraki (JP); Kouji Akazawa, Ibaraki (JP); Hideyuki Usui, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 126 days.

(21) Appl. No.: 12/547,136

(22) Filed: Aug. 25, 2009

(65) Prior Publication Data

US 2010/0053960 A1 Mar. 4, 2010

(30) Foreign Application Priority Data

Aug. 27, 2008 (JP) ................. 2008-217518

(51) Int. Cl.
*B32B 9/04* (2006.01)
(52) U.S. Cl. ............ 428/447; 528/4; 528/5; 528/9; 528/33
(58) Field of Classification Search ............ 528/4, 5, 528/9, 33; 428/447
See application file for complete search history.

(56) References Cited

U.S. PATENT DOCUMENTS

| | | | |
|---|---|---|---|
| 4,152,509 A * | 5/1979 | Yajima et al. | 528/4 |
| 4,228,270 A | 10/1980 | Kobayashi | |
| 5,614,654 A * | 3/1997 | Miyake et al. | 556/10 |
| 7,457,507 B2 * | 11/2008 | Kuramoto et al. | 385/141 |

FOREIGN PATENT DOCUMENTS

| | | |
|---|---|---|
| EP | 1439406 A1 | 7/2004 |
| EP | 2065429 A1 | 6/2009 |
| JP | 10-152561 A | 6/1998 |
| JP | 2001-272507 A | 10/2001 |
| JP | 2005-276849 A | 10/2005 |
| JP | 2008-162191 A | 7/2008 |

OTHER PUBLICATIONS

Extended European Search Report dated Oct. 20, 2009 English.

* cited by examiner

*Primary Examiner* — Margaret Moore
(74) *Attorney, Agent, or Firm* — Sughrue Mion, PLLC

(57) ABSTRACT

The present invention provides a microlens array produced by molding a resin obtained by reacting a silicon compound with a boron compound or an aluminum compound, in which the silicon compound is represented by the following formula (I):

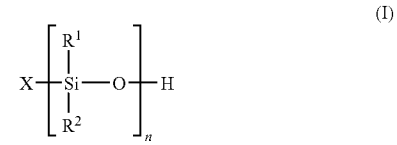

in which $R^1$ and $R^2$ each independently represent an alkyl group, a cycloalkyl group, an alkenyl group, an alkynyl group, or an aryl group, in which a plurality of $R^1$'s are the same or different and a plurality of $R^2$'s are the same or different; X represents a hydroxy group, an alkoxy group, an alkyl group, a cycloalkyl group, an alkenyl group, an alkynyl group, or an aryl group; and n is 4 to 250. This microlens array has excellent heat resistance and light resistance even when applied to LEDs having an increased power and to LEDs emitting blue light having a short wavelength.

7 Claims, No Drawings

MICROLENS ARRAY

FIELD OF THE INVENTION

The present invention relates to a microlens array. More particularly, the invention relates to a microlens array for use in optoelectronic appliances.

BACKGROUND OF THE INVENTION

Microlens arrays are used in optoelectronic appliances such as liquid-crystal projectors, video cameras, view finders, and portable TVs. For example, a microlens array is used for the purpose of obtaining the effect of condensing the light from an LED array or the effect of improving the luminance of an LED array (see, JP-A-2005-276849). Furthermore, acrylic resins are known as resins for producing microlens arrays (see, JP-A-2001-272507).

A possible measure in improving luminance is to heighten the power of an LED to thereby increase the quantity of light emitted. However, LEDs which emit light in an increased quantity generate heat in a larger amount. In addition, use of such LEDs results in cases where heat resistance is insufficient even when an acrylic resin is used. Accordingly, there is a desire for a microlens array having excellent heat resistance. There also is a desire for a microlens array having excellent light resistance even at the short wavelength of the blue light of LEDs.

SUMMARY OF THE INVENTION

An object of the invention is to provide a microlens array which has excellent heat resistance and light resistance even when applied to LEDs having an increased power and to LEDs emitting blue light having a short wavelength.

Namely, the invention provides the following items.

1. A microlens array produced by molding a resin obtained by reacting a silicon compound with a boron compound or an aluminum compound, wherein the silicon compound is represented by the following formula (I):

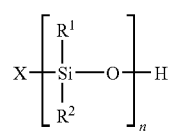

wherein $R^1$ and $R^2$ each independently represent an alkyl group, a cycloalkyl group, an alkenyl group, an alkynyl group, or an aryl group, in which a plurality of $R^1$'s are the same or different and a plurality of $R^2$'s are the same or different; X represents a hydroxy group, an alkoxy group, an alkyl group, a cycloalkyl group, an alkenyl group, an alkynyl group, or an aryl group; and n is 4 to 250.

2. The microlens array according to item 1, wherein the boron compound is a compound represented by the following formula (II):

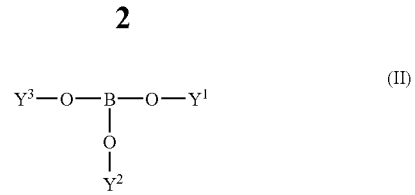

wherein $Y^1$, $Y^2$, and $Y^3$ each independently represent hydrogen or an alkyl group.

3. The microlens array according to item 1, wherein the aluminum compound is a compound represented by the following formula (III):

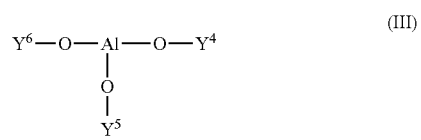

wherein $Y^4$, $Y^5$, and $Y^6$ each independently represent hydrogen or an alkyl group.

4. The microlens array according to item 1, wherein $R^1$ and $R^2$ each are methyl and X is hydroxy.

5. The microlens array according to item 2, wherein the boron compound is triisopropyl borate.

6. The microlens array according to item 3, wherein the aluminum compound is aluminum triisopropoxide.

7. An optoelectronic appliance comprising the microlens array according to item 1 mounted thereon.

8. An LED array comprising the microlens array according to item 1 mounted thereon.

According to the invention, there can be provided a microlens array which has excellent heat resistance and light resistance even when applied to LEDs having an increased power and to LEDs emitting blue light having a short wavelength.

The microlens array of the invention can be suitably used in optoelectronic appliances such as liquid-crystal projectors, video cameras, view finders, and portable TVs.

DETAILED DESCRIPTION OF THE INVENTION

The microlens array of the invention is produced by molding a resin obtained by reacting at least one silicon compound represented by the formula (I) with at least one boron compound or at least one aluminum compound. The microlens array obtained from this resin has excellent heat resistance even when applied to LEDs having an increased power, and has excellent light resistance with no discoloration even when applied to LEDs emitting blue light having a short wavelength.

The silicon compound represented by the formula (I) is a compound represented by

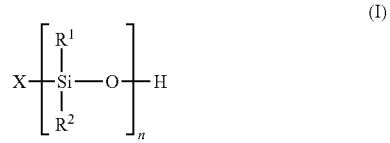

wherein $R^1$ and $R^2$ each independently represent an alkyl group, a cycloalkyl group, an alkenyl group, an alkynyl group, or an aryl group, in which a plurality of $R^1$'s are the same or different and a plurality of $R^2$'s are the same or different; X represents a hydroxy group, an alkoxy group, an alkyl group, a cycloalkyl group, an alkenyl group, an alkynyl group, or an aryl group; and n is 4 to 250.

In the formula (I), $R^1$ and $R^2$ each independently represent an alkyl group, cycloalkyl group, alkenyl group, alkynyl group, or aryl group. The number of carbon atoms of each of these groups is preferably 1-18, more preferably 1-12, and even more preferably 1-6, from the standpoints of reactivity, stability, and profitability. Examples thereof include alkyl groups such as methyl, ethyl, propyl and isopropyl; cycloalkyl groups such as cyclopentyl and cyclohexyl; alkenyl groups such as vinyl and allyl; alkynyl groups such as ethynyl and propynyl; and aryl groups such as phenyl and tolyl. It is especially preferred that $R^1$ and $R^2$ each independently are methyl.

In the formula (I), X represents a hydroxy group, alkoxy group, alkyl group, cycloalkyl group, alkenyl group, alkynyl group, or aryl group. The number of carbon atoms of each of these groups other than hydroxy is preferably 1-18, more preferably 1-12, and even more preferably 1-6, from the standpoints of reactivity, stability, and profitability. Examples thereof include alkoxy groups such as methoxy and ethoxy; alkyl groups such as methyl, ethyl, propyl and isopropyl; cycloalkyl groups such as cyclopentyl and cyclohexyl; alkenyl groups such as vinyl and allyl; alkynyl groups such as ethynyl and propynyl; and aryl groups such as phenyl and tolyl. It is especially preferred that X is hydroxy.

In the formula (I), n is a number of 4-250, and is preferably 4-200, and more preferably 4-160, from the standpoint of the heat resistance and flexibility of the reaction product.

Examples of the silicon compound represented by the formula (I) include polydimethylsiloxane terminated by a silanol group at each end, polydiphenylsiloxane terminated by a silanol group at each end, polydimethylsiloxane terminated by a silanol group at one end, polydiphenylsiloxane terminated by a silanol group at one end, and polymethylphenylsiloxane terminated by a silanol group at each end. Such silicon compounds may be used alone or in combination of two or more thereof. Preferred of these is polydimethylsiloxane terminated by a silanol group at each end, in which $R^1$ and $R^2$ each are methyl and X is hydroxy.

The number-average molecular weight of the silicon compound represented by the formula (I) is preferably 300-20,000, more preferably 300-15,000, and even more preferably 300-12,000, from the standpoint of the heat resistance and flexibility of the reaction product. Number-average molecular weight can be determined by NMR spectroscopy or GPC.

In preparing the resin, one or more silicon compounds other than the silicon compound represented by the formula (I) may also be used so long as this does not lessen the effects of the invention. However, the amount of the silicon compound represented by the formula (I) to be used is preferably 30-99% by weight, more preferably 50-99% by weight, and even more preferably 60-99% by weight, of the mixture to be subjected to the reaction, from the standpoints of heat resistance, transparency, and light resistance.

The boron compound preferably is a compound represented by the formula (II):

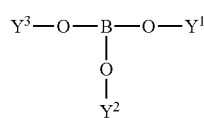

(II)

wherein $Y^1$, $Y^2$, and $Y^3$ each independently represent hydrogen or an alkyl group.

The number of carbon atoms of each alkyl group in the formula (II) is preferably 1-12, more preferably 1-6, and even more preferably 1-3. Examples of the alkyl group include methyl, ethyl, propyl, and isopropyl. Preferred of these is isopropyl.

Examples of the compound represented by the formula (II) include boric acid, trimethyl borate, triethyl borate, and triisopropyl borate. Such compounds may be used alone or in combination of two or more thereof. Preferred of these is triisopropyl borate.

The weight ratio between the silicon compound represented by the formula (I) and the boron compound in a mixture to be reacted (silicon compound/boron compound) is preferably from 95/5 to 30/70, more preferably from 95/5 to 50/50, even more preferably from 95/5 to 60/40, and most preferably from 95/5 to 70/30, from the standpoints of heat resistance, transparency, and light resistance.

The aluminum compound preferably is a compound represented by the formula (III):

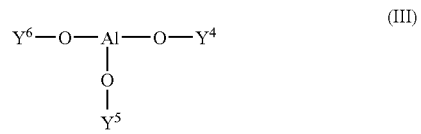

(III)

wherein $Y^4$, $Y^5$, and $Y^6$ each independently represent hydrogen or an alkyl group.

The number of carbon atoms of each alkyl group in the formula (III) is preferably 1-12, more preferably 1-6, and even more preferably 1-3. Examples of the alkyl group include methyl, ethyl, propyl, and isopropyl. Preferred of these is isopropyl.

Examples of the compound represented by the formula (III) include aluminum trimethoxide, aluminum triethoxide, aluminum triisopropoxide, and aluminum tributoxide. Such compounds may be used alone or in combination of two or more thereof. Preferred of these is aluminum triisopropoxide.

The weight ratio between the silicon compound represented by the formula (I) and the aluminum compound in a mixture to be reacted (silicon compound/aluminum compound) is preferably from 99/1 to 30/70.

The reaction of the silicon compound represented by the formula (I) with the boron compound or aluminum compound can be conducted, for example, at a temperature of 0-100° C. for 1-48 hours with stirring in the absence of a solvent. In the case where the aluminum compound was used in the reaction, the resultant reaction mixture may be filtered and a volatile matter may be removed therefrom. In the manner described above, a polyborosiloxane or polyaluminosiloxane resin can be obtained.

The resin has a viscosity as measured at 25° C. of preferably 100-20,000 mPa·s, and more preferably 1,000-10,000 mPa·s. The values of viscosity are ones measured with a rheometer under the conditions of a temperature of 25° C. and 1 atm.

Although this resin is subsequently used for producing a microlens array, the resin may be formed beforehand into a film in a semi-cured state. In this case, use may be made of a method in which the resin is applied to a poly(ethylene terephthalate) film, glass plate, or the like and then dried by heating preferably at 80-250° C., and more preferably 100-200° C., for preferably from 1 minute to 2 hours, and more preferably from 5 minutes to 1 hour, to thereby obtain a semi-cured film of polyborosiloxane or polyaluminosiloxane. The drying operation may optionally be conducted two or more times. The thickness of this film is preferably 50-5,000 µm, and more preferably 100-4,000 µm.

In a preferred embodiment of the invention, the microlens array is produced by a process which preferably includes: (a) the step of producing a base material having the same shape as the microlens array; (b) the step of using the base material to produce a molding die having a shape reverse to that of the microlens array; and (c) the step of using the molding die to transfer the shape of the microlens array to the resin.

In the step (a), the base material preferably is one constituted of silicon, quartz glass, a copper alloy, an iron alloy, a nickel alloy, or a resin plate or film (e.g., a polyimide or poly(methyl methacrylate)). It is also preferred that the same shape as that of the target microlens array be formed by machining, etching, light irradiation, or the like to produce the base material. It is preferred that the microlenses have a nearly semispherical shape with a diameter of 0.7-50 µm and a height of 0.35-25 µm. The microlens array preferably includes such microlenses arranged at a constant pitch and/or disposed in a closest-packing arrangement.

In the step (b), the molding die which has a shape reverse to that of the base material having a microlens array shape can be produced by electroforming with Au, Ag, Al, Cr, Ni, or the like in the following manner. The surface of the base material is plated with such a metal by electroplating to form a deposit having a thickness of preferably 0.15-0.5 mm, and the metal deposit is then removed from the base material to produce the molding die.

In the step (c), it is preferable that the molding die is used to transfer the microlens array shape to the resin. Specifically, use may be made of a method which includes transferring a semi-cured film of the resin to a quartz plate, subsequently disposing the molding die on the film, and pressing the resultant assemblage with a vacuum laminator at 0.1-1.0 MPa and 100-180° C. for 0.5-5 minutes. Thus, the microlens array shape can be transferred to the resin.

Further, the step (c) may include a step in which the resin is applied to a substrate, a step in which the resin is pressed against the molding die having a shape reverse to the shape of the microlens array, and a step in which the resin is cured.

The microlens array of the invention can be suitably used in optoelectronic appliances such as liquid-crystal projectors, video cameras, view finders, and portable TVs. The invention hence provides an optoelectronic appliance or LED array which includes the microlens array mounted thereon. This optoelectronic appliance or LED array can be obtained by suitably producing the microlens array so as to correspond to an optoelectronic appliance or LED array and using the microlens array in the optoelectronic appliance or disposing the microlens array over the LED array.

EXAMPLES

Example 1

To 10.0 g (33.3 mmol) of a silicone oil terminated by a silanol group at each end (silicon compound represented by the formula (I) in which $R^1$ and $R^2$ are methyl, X is hydroxy, and n is 4; number-average molecular weight, 300) was added 4.22 g (22.4 mmol) of triisopropyl borate (compound represented by the formula (II) in which $Y^1$, $Y^2$, and $Y^3$ are isopropyl). This mixture was stirred at room temperature for 2 hours to obtain a polyborosiloxane (viscosity at 25° C., 1,000 mPa·s). Thereafter, the polyborosiloxane was applied with a coater to a poly(ethylene terephthalate) film in such an amount as to result in a thickness of 100 µm at a line speed of 0.3 m/min. The coating was dried in a drying oven at 100° C. for 10 minutes to form a film of the polyborosiloxane. Thereafter, the film obtained was cut into a strip, and this strip was placed in a drying oven and subjected to additional drying at 130° C. for 10 minutes to obtain a film in a semi-cured state.

Subsequently, a base material (made of a polyimide) was processed by laser ablation to impart thereto the same shape as a microlens array (shape of each microlens, semispherical; diameter, 10 µm; height, 5 µm; the microlenses had been arranged in seven rows). This base material was then subjected to nickel electroforming to produce an electroformed nickel molding die (size, 1 cm×2 cm; thickness, 0.2 mm) having a shape reverse to the shape of the microlens array. On the other hand, the film obtained was cut into a size of 1 cm×2 cm, and this film piece was transferred to a quartz plate having a thickness of 0.5 mm. Thereafter, the electroformed nickel molding die was placed on the film. The resultant assemblage was pressed with a vacuum laminator (vacuum laminator V130, manufactured by Nichigo-Morton Co., Ltd.) at 0.5 MPa and 150° C. for 5 minutes to transfer the shape of the microlens array (shape of each microlens, semispherical; diameter, 10 µm; height, 5 µm; the microlenses had been arranged in seven rows) to the film. Thus, the polyborosiloxane film was molded to obtain a microlens array.

The microlens array obtained was disposed on the upper side of an LED array including LEDs arranged in seven rows (1.5-W high-power LEDs; SL-V-B40AC (blue), manufactured by SemiLEDs Corp.; forward current, 500 mA; forward voltage, 3.4 V) to obtain an LED array having the microlens array mounted thereon. Subsequently, this LED array was subjected to a continuous heat resistance/light resistance test under the conditions of 120° C. Luminance was used as a criterion for evaluation. Luminance was measured with Bm-9 (manufactured by Topcon Technohouse Corp.). The luminance as measured after 1,000 hours was compared with the luminance as measured at the time of test initiation. As a result, the decrease in luminance was found to be about 3.5%.

Example 2

To 129 g (129 mmol) of a silicone oil terminated by a silanol group at each end (silicon compound represented by the formula (I) in which $R^1$ and $R^2$ are methyl, X is hydroxy, and n is 13; number-average molecular weight, 1,000) was added 6.97 g (34.1 mmol) of aluminum triisopropoxide (compound represented by formula (III) in which $Y^4$, $Y^5$, and $Y^6$ are isopropyl). This mixture was stirred at room temperature for 2 hours to obtain a white suspension. This suspension was filtered, and a volatile matter was removed with a rotary evaporator to obtain a polyaluminosiloxane (viscosity at 25° C., 1,350 mPa·s). Subsequently, the polyaluminosiloxane was used to obtain a film in a semi-cured state in the same manner as in Example 1. Thereafter, in the same manners as in Example 1, a microlens array was produced and an LED array having the microlens array mounted thereon was obtained. Subsequently, this LED array was subjected to a continuous heat resistance/light resistance test under the conditions of 120° C. The luminance as measured after 1,000 hours was compared with the luminance as measured at the time of test initiation. As a result, the decrease in luminance was found to be 2.5%.

Comparative Example 1

Transparent epoxy resin NT-8050 (manufactured by Nitto Denko Corp.) was used as a resin to produce a microlens array in the same manner as in Example 1. An LED array having the microlens array mounted thereon was obtained in the same manner as in Example 1. Subsequently, this LED array was subjected to a continuous heat resistance/light resistance test under the conditions of 120° C. After 1,000 hours, the state of the microlens array was examined. As a result, the microlens array was found to have yellowed. A luminance decrease of 30% or more from the initial value at test initiation was observed.

While the present invention has been described in detail and with reference to specific embodiments thereof, it will be apparent to one skilled in the art that various changes and modifications can be made therein without departing from the scope thereof.

This application is based on Japanese patent application No. 2008-217518 filed Aug. 27, 2008, the entire contents thereof being hereby incorporated by reference.

What is claimed is:

1. A microlens array produced by molding a resin obtained by reacting a silicon compound with a boron compound or an aluminum compound, wherein the silicon compound is represented by the following formula (I):

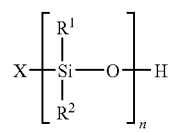

(I)

wherein $R^1$ and $R^2$ are each methyl; X represents a hydroxy group; and n is 4 to 250.

2. The microlens array according to claim 1, wherein the boron compound is a compound represented by the following formula (II):

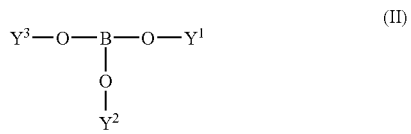

(II)

wherein $Y^1$, $Y^2$, and $Y^3$ each independently represent hydrogen or an alkyl group.

3. The microlens array according to claim 1, wherein the aluminum compound is a compound represented by the following formula (III):

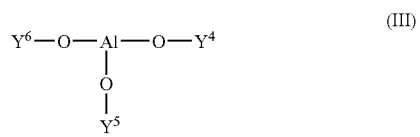

(III)

wherein $Y^4$, $Y^5$, and $Y^6$ each independently represent hydrogen or an alkyl group.

4. The microlens array according to claim 2, wherein the boron compound is triisopropyl borate.

5. The microlens array according to claim 3, wherein the aluminum compound is aluminum triisopropoxide.

6. An optoelectronic appliance comprising the microlens array according to claim 1 mounted thereon.

7. An LED array comprising the microlens array according to claim 1 mounted thereon.

* * * * *